United States Patent [19]
Rife et al.

[11] Patent Number: 5,111,366
[45] Date of Patent: May 5, 1992

[54] CAP HAVING ILLUMINATED INDICIA

[75] Inventors: Guerin D. Rife; W. Preston Willingham, both of Winter Park, Fla.

[73] Assignee: Gift Asylum, Inc., Winter Park, Fla.

[21] Appl. No.: 702,270

[22] Filed: May 17, 1991

[51] Int. Cl.⁵ .............................................. A42B 1/24
[52] U.S. Cl. ..................................... 362/31; 362/106; 2/209.2
[58] Field of Search ................. 362/105, 106, 812, 31, 362/26; 2/209.2

[56] References Cited

U.S. PATENT DOCUMENTS

| | | |
|---|---|---|
| D. 281,031 | 10/1985 | Gilligan . |
| D. 284,328 | 6/1986 | Bieber . |
| D. 294,877 | 3/1988 | Burley . |
| D. 301,383 | 6/1989 | Pesta . |
| 1,206,356 | 11/1916 | Norton .............................. 362/106 |
| 2,203,028 | 6/1940 | Patorillo .......................... 362/106 |
| 2,473,394 | 6/1949 | Scott ................................ 362/106 |
| 4,163,998 | 8/1979 | Anderson et al. .............. 362/252 |
| 4,231,079 | 10/1980 | Heminover ...................... 362/106 |
| 4,386,437 | 6/1983 | Fosher . |
| 4,570,206 | 2/1986 | Deutsch ........................... 362/106 |
| 4,586,280 | 5/1986 | Dane . |
| 4,667,274 | 5/1987 | Daniel .............................. 362/106 |
| 4,776,043 | 10/1988 | Coleman . |
| 4,777,667 | 10/1988 | Patterson et al. . |
| 4,827,384 | 5/1989 | Von Schlemmer ............ 362/106 |
| 4,873,726 | 10/1989 | Tapia . |
| 4,901,211 | 2/1990 | Shen . |
| 4,914,755 | 4/1990 | Motley . |

*Primary Examiner*—Richard R. Cole
*Attorney, Agent, or Firm*—Julian C. Renfro

[57] ABSTRACT

A cap for displaying information on the front thereof, this cap comprising a crown portion adapted to be worn on the head of the user and having a front section, with the front section having an opening therein. Adjacent this opening is a panel-supporting arrangement, with this panel-supporting arrangement being configured to receive a panel of transparent material and to support same adjacent the opening. The transparent panel is illuminated from its edge, with a battery supplying the power for the illumination arrangement.

12 Claims, 6 Drawing Sheets

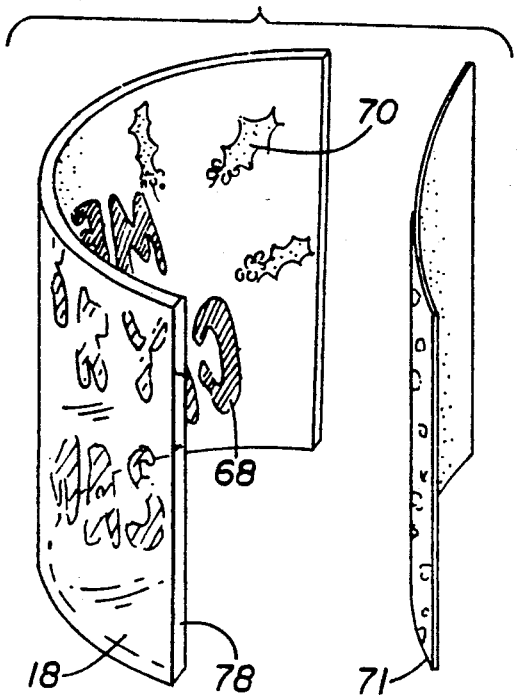
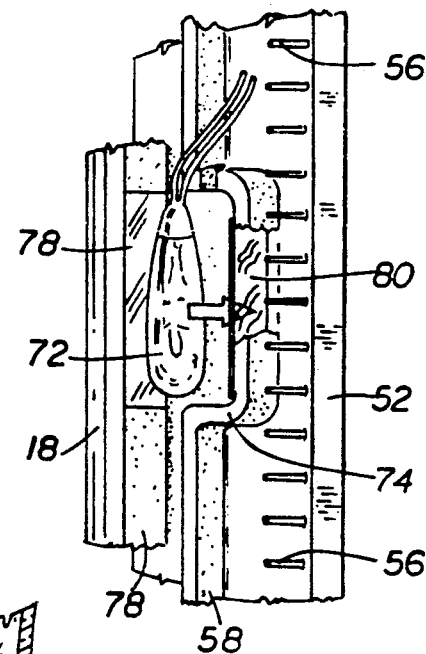
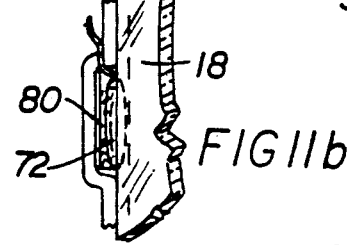
FIG 10
FIG 11a
FIG 11b
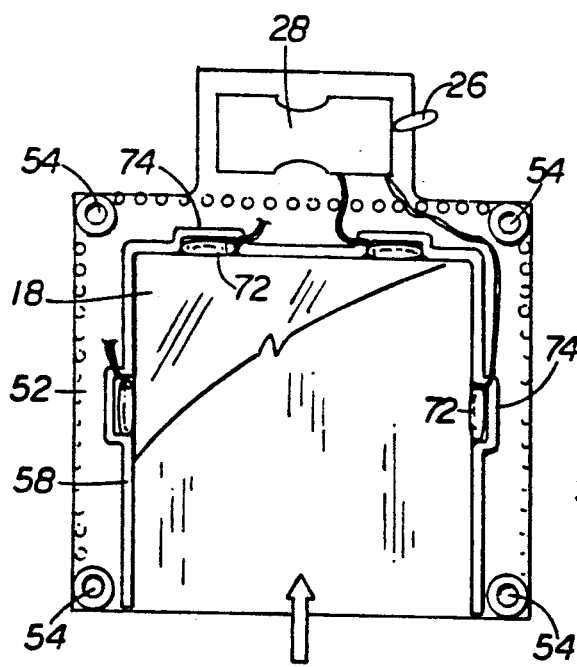
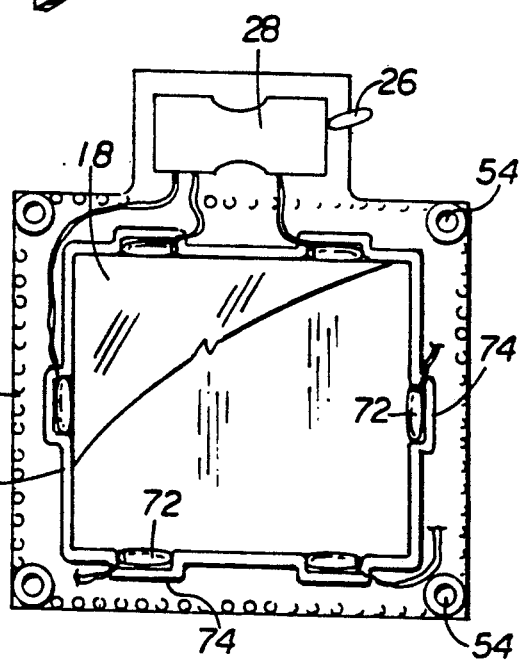
FIG 12a
FIG 12b FIG 13
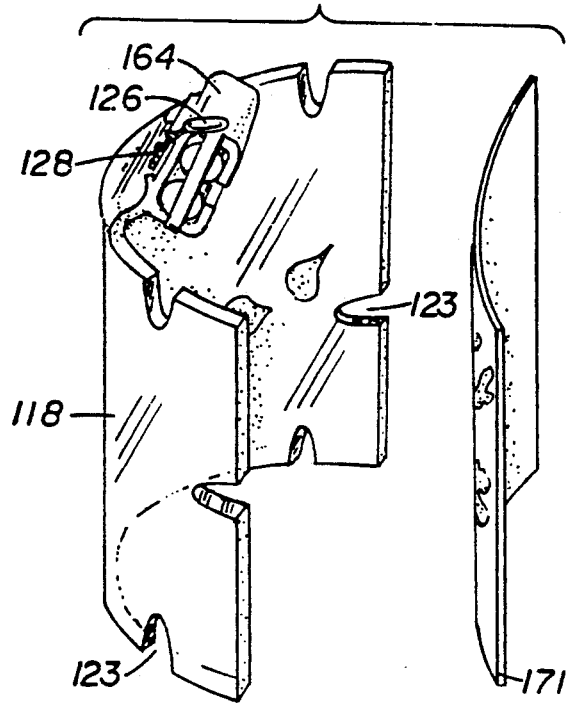
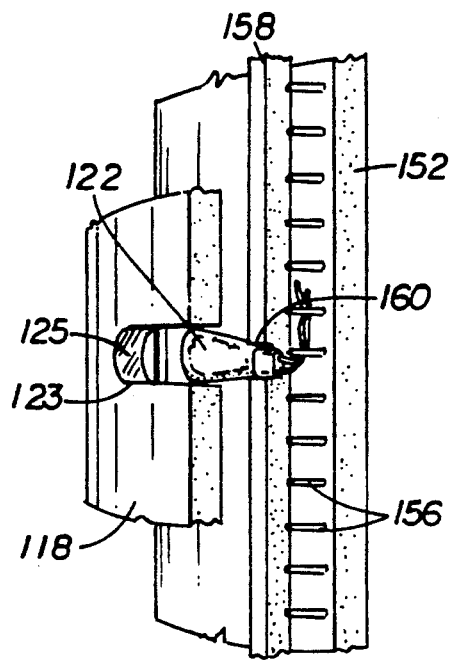
FIG 14
FIG 15
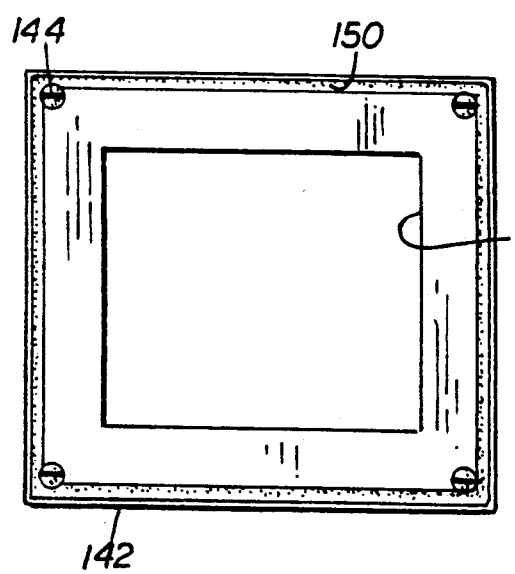
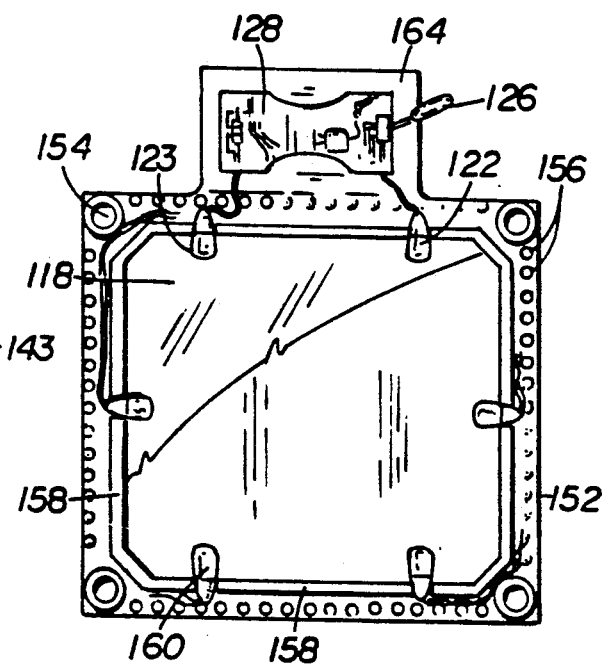
FIG 16

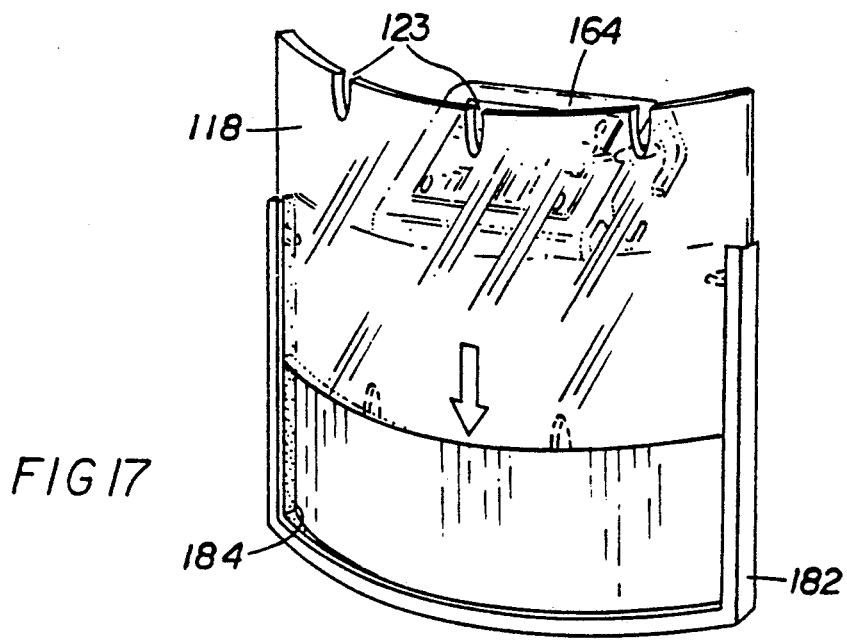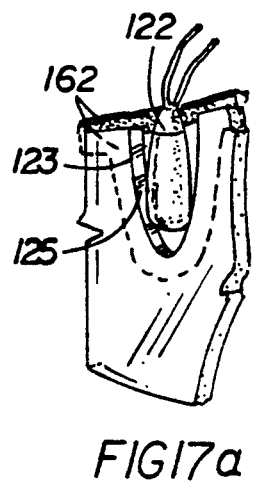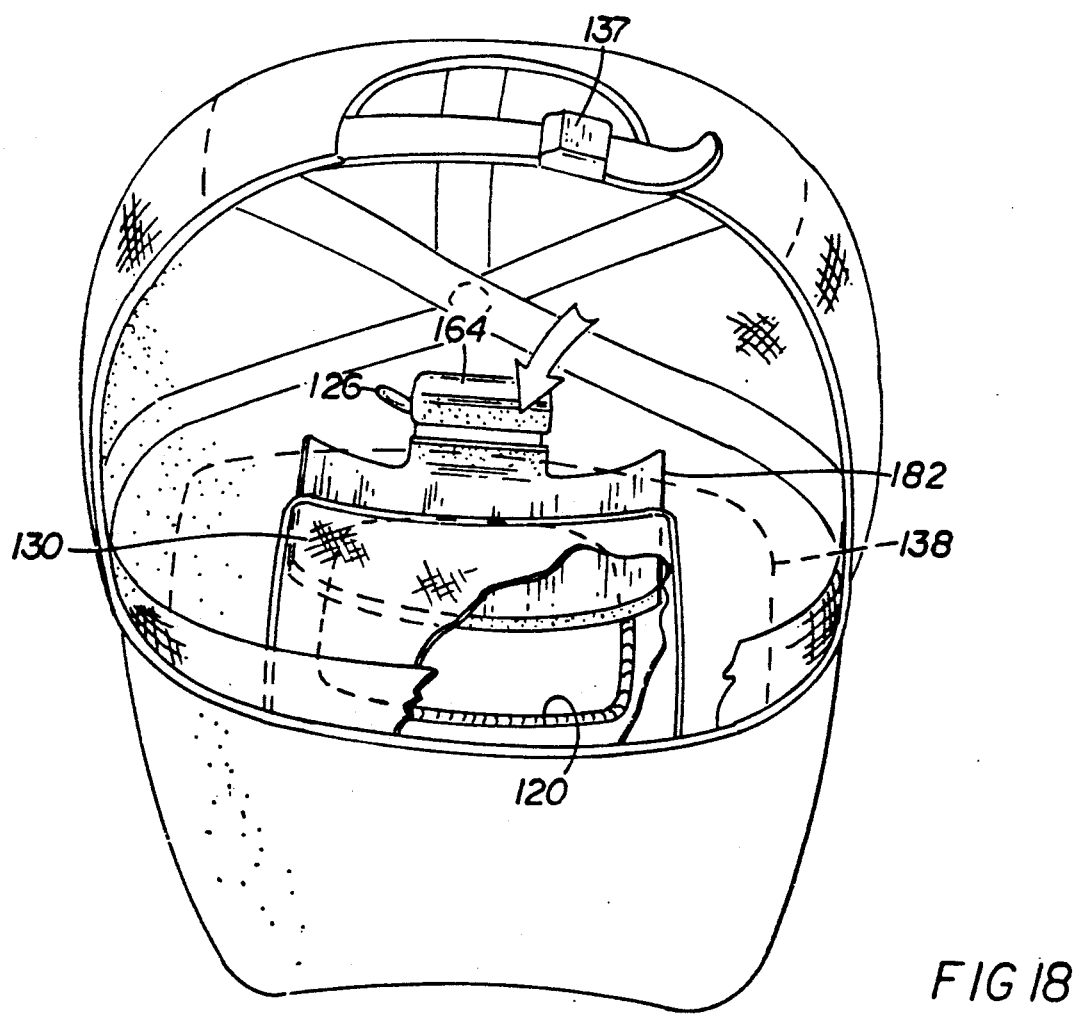

3,111,366

CAP HAVING ILLUMINATED INDICIA

BACKGROUND OF THE INVENTION

This invention relates generally to caps displaying certain information thereon, and more particularly to a baseball-type cap having novel illumination and display means on a front portion of the cap.

Hats and other headwear have become increasingly popular in recent years. In particular, casual "baseball-cap" style sporting hats are versatile, easily adjustable, and useful for protecting the wearer's eyes from sunlight or rain. It is well known that such hats may be decorated with screen-printed or embroidered names, logos, or other information, and are similar in popularity to screen-printed T-shirts. Another significant reason for the popularity of these hats is that the hats themselves are worn by professional (and not so professional) athletes in many team sports, and fans and supporters of these teams regularly wear caps adorned with their favorite team's name and/or logo. In fact, sales of screen printed and embroidered hats and caps is a big business, both at retail stores and as concession sales at sporting events.

Inexpensive baseball-type caps with advertising material thereon may be handed out or sold by manufacturers or businesses as a very practical type of promotional material. It is apparent that the more striking or obvious the advertising material is upon a cap, the more it will be noticed by the public and will thus be better advertising. A novelty type display on the front of a cap, being at normal eye level, is quickly noticed by everyone within view and provides an excellent advertising medium for any manufacturer or business dealing in soft drinks, sports devices, entertainment spots and the like.

It is the intent of the present invention to provide a baseball style cap having an attractive, illuminated panel on its front surface, which can carry a variety of different designs, phrases or logos.

Examples of conventional headwear of the type to which the present invention relates are shown in U.S. Pat. Nos. 1,146,979; 1,572,210; 1,744,777, and French Patent No. 1,221,782. Such patents illustrate enclosures for the storage of batteries and the like, and show arrangements for the inclusion on the headwear of a source of illumination for various purposes. These are relatively complex setups, involving the awkward and cumbersome placement of components, and the enclosures are specifically configured confinements dedicated to particular applications. No provision is made for removal of the light source for use apart from the headwear. Furthermore, the produced light pattern is inconvenient for applications such as night fishing where it is desired to direct a narrow beam of light, with little lateral projection, to a work area directly ahead and just above the waist of the wearer.

U.S. Pat. No. 4,406,040 illustrates a mechanism for attaching a conventional flashlight illumination device to the brim of a hat. While this overcomes the lack of usability elsewhere of the lamp of the foregoing devices, the light is beamed down ahead of the user from above the visor, and no shielding is provided against lateral scattering.

The present invention distinguishes over these prior art devices in a number of significant ways.

SUMMARY OF THE INVENTION

In accordance with one embodiment of our novel cap for displaying information, such as illuminated indicia, the cap comprises a crown portion adapted to be worn on the head of the user and having a front section. The optional visor portion is affixed to the front of the crown portion, directly below the front section, with the front section having an opening therein. Along the sides of this opening are panel-supporting means, which panel-supporting means are configured to receive a panel of semi-rigid or rigid transparent material, which preferably possesses curvature. In some instances we can use translucent material, and when we use the term transparent, we mean to include translucent, inasmuch as translucent is a special case of transparent.

The panel of transparent material we use may have indicia molded or etched into the surface thereof, or a decal may be applied to the panel. Still another option is for an object to be painted on this panel of transparent plastic. A plain or printed background card may be used with any of these.

Means are provided in accordance with this invention for illuminating the transparent panel, typically utilizing one or more small bulbs, placed so as to accomplish a highly satisfactory form of edge lighting. If we utilize an integrated circuit in connection with the power supply we use, the bulbs can be operated at controlled intervals, and in controlled sequences. Another option is for the bulbs to consistently or randomly blink, and as still another option, bulbs of different colors may be used.

One embodiment of a panel-supporting means takes the form of a pocket formed on an interior surface of the crown, whereas another embodiment of a panel-supporting means may take the form of a member clamped to the interior surface of the crown, which member is configured to slidably or permanently receive the panel.

The principal object of this invention is therefore to provide a baseball-type cap with an illuminated display that will attract great attention and provide a considerable amount of advertising value for an advertiser, amusement for parties, and the like.

Another object of this invention is to provide a novel display arrangement for a cap, utilizing a panel of transparent material, upon which suitable indicia may be disposed, with intermittently operating illumination means utilized to draw attention to the indicia.

Still another object of this invention is to provide a novel cap utilizing a transparent plastic panel on the front portion thereof, which panel may possess curvature not only to provide more display space and increase comfort for the wearer of the cap, but also to enhance the appearance of the cap.

Yet still another object of this invention is to provide a novel cap utilizing a curved, transparent front panel illuminated by an edge lighting arrangement, which panel attracts a considerable amount of attention as a result of being illuminated intermittently and because of the many different types of indicia that may be displayed thereon.

These and other objects, features and advantages will be more apparent from a study of the appended drawings.

BRIEF DESCRIPTION OF DRAWINGS

FIG. 10 is a view of a curved transparent panel of the type we may use on the front of our caps, immediately behind which is shown a backer or background card;

FIG. 11a is a fragmentary view revealing a typical arrangement by which a bulb is able to illuminate an edge of the transparent panel in a highly effective manner;

FIG. 11b is a quite small fragmentary view revealing other details of the illumination of the edge of the transparent panel;

FIG. 12a is a view of a panel-receiving member of the type that slidably receives a transparent panel; and FIG. 12b is a view of a panel-receiving member of the type into which a transparent panel is directly placed, with this panel-receiving member utilizing illumination means on all four sides.

FIG. 13 is a view of a modified form of our transparent panel, with this embodiment involving the holder for the battery and the integrated circuit being molded directly to the top of the panel, with a background card of a preferred type being shown adjacent the backside of the panel;

FIG. 14 is a fragmentary view, to a large scale, of a typical bulb being supported by its base in the boundary defining member, with a bulb-receiving notch located in the edge of the panel to receive the bulb;

FIG. 15 is a view of a modified form of frame-like member of the type used on the front of our cap, this being the backside of the frame-like member;

FIG. 16 is a modified form of a panel-receiving member, revealing the use of inwardly directed bulbs on all four sides of the panel, and further showing the support for the battery and the integrated circuit at the top of the panel-receiving member;

FIG. 17 is a perspective view of still another embodiment of our invention, in which the panel-receiving member is provided with slots along opposite side edges, in which slots, the sides of a transparent panel in accordance with this invention are received, with the top of the panel-receiving member also serving as the mounting means for a battery holder;

FIG. 17a is a fragmentary view, to a large scale, showing opaque reflective tape used alongside the edge of a transparent panel, with this tape serving to enhance the edge lighting of the panel as well as holding the bulb in place; and FIG. 18 is a view of the interior of this embodiment of our novel cap, in which we reveal that the panel-receiving member of FIG. 17 can be inserted into the top of a pocket defined on the interior of the cap, adjacent the front aperture of the cap.

DETAILED DESCRIPTION

Figure 1:
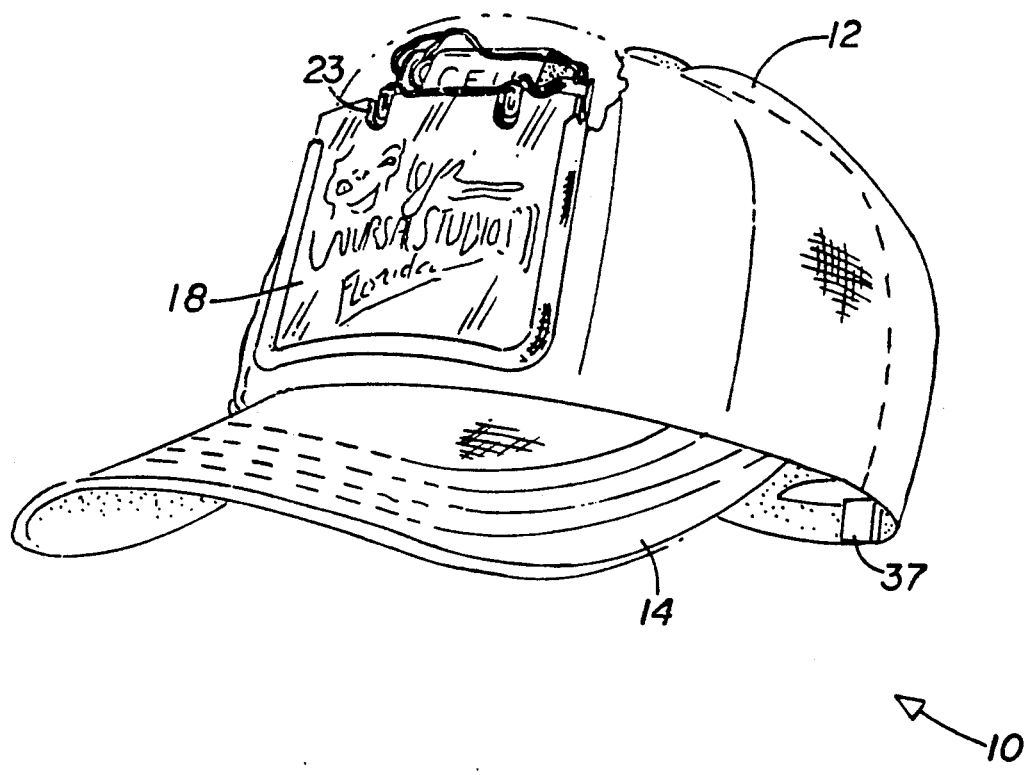
FIG. 1 is a perspective view of a cap in accordance with our invention, upon the front of the crown of which is mounted a curved transparent panel for which suitable illumination means are provided.
Figure 4:
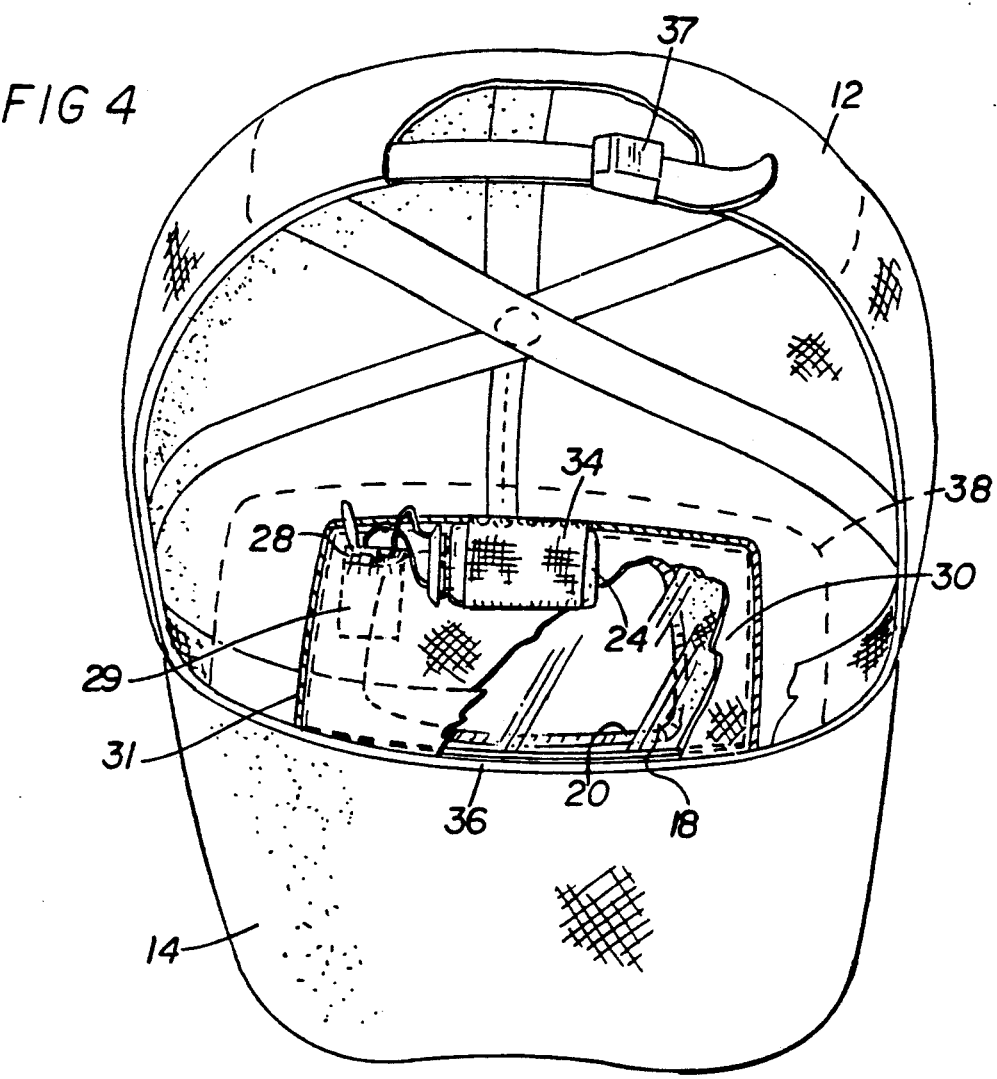
FIG. 4 is an interior view, revealing that a flap utilized in conjunction with this embodiment of our cap can be moved aside to permit insertion of the transparent panel into a panel-receiving means located in the front interior portion of the cap.

With initial reference to FIG. 1 it will there be seen that we have shown an exemplary version of our novel cap 10, which may have a crown portion 12 as well as a visor or bill 14. In accordance with accepted practice, we can utilize a size adjustment feature in a rear portion of the headband located along the bottom edge of the crown portion, so that the cap can be adapted to a number of different head sizes; note the clasp 37 as shown in FIGS. 1 and 4.

An important aspect of our invention is the use of an illuminated front panel 18 constructed of transparent material, such as relatively stiff plastic. In some instances we can use translucent material, and when we use the term translucent, we intend to include transparent, inasmuch as transparent is a special case of translucent. We have found that acrylic as the material from which the panel is made is particularly satisfactory, but we are not to be limited to this material.

Our transparent panel typically possesses a suitable degree of curvature, and is preferably disposed at a location in the crown portion 12 of the cap where a hole or aperture of suitable size has been created. As is obvious, a curved panel has more square inches of display area, and provides considerable comfort in that it conforms readily to the configuration of the wearer's forehead. In addition, we find that the appearance of the cap is enhanced by the use of a curved panel, but we could use a flat panel, if desired.

As will be seen hereinafter, the transparent panel 18 is somewhat larger than the hole or aperture 20 we utilize in the crown portion in the front of the cap, and we employ appropriate panel-supporting means, accessible from the interior of the crown, on each side of the hole or aperture. In accordance with one embodiment of our invention, the panel-supporting means takes the form of slots that slidably receive the relatively straight side edges of the transparent panel, whereas in accordance with another embodiment, the transparent panel is held in place between a member on the interior of the cap and a member on the exterior of the cap that are interfitted tightly together.

Figure 2:
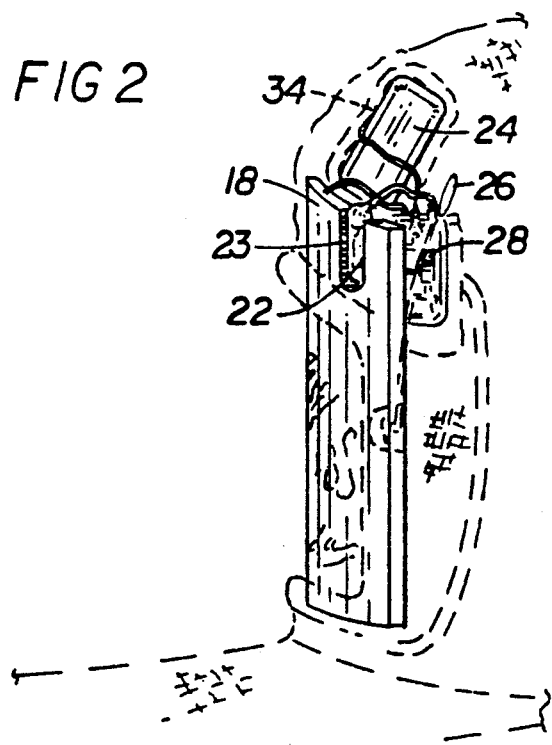
FIG. 2 is a side view of the front of the crown, with the fabric of the cap broken away to reveal an edge of the transparent panel as well as one or more bulbs and certain of the components associated with the illumination of the panel.
Figure 3:
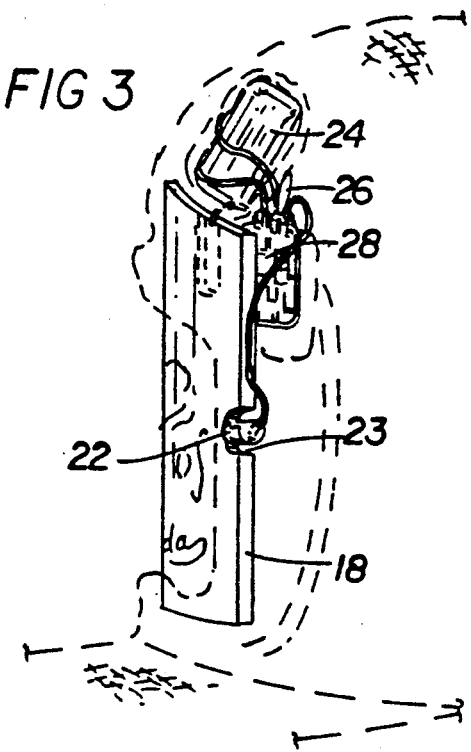
FIG. 3 is a view similar to FIG. 2, but revealing that the bulb or bulbs for illuminating the panel can be located on the side as well as on the top of the panel.

As will be noted from FIG. 1, but as seen in greater detail in FIGS. 2 and 3, we provide highly effective edge type illumination means for the transparent panel 18, which may take the form of two or more bulbs 22 of a suitable type, such as of gallium arsenide. Other types of illumination could include the use of so-called grain of wheat bulbs, or light emitting diodes (LEDs). The power supply may be a battery 24 of a suitable type, contained in a battery holder 34. The different types of batteries we may use are discussed hereinafter.

FIGS. 1 and 2 reveal that the bulb or bulbs 22 we utilize to accomplish edge lighting may be mounted in suitable indentations or notches 23 created along the upper edge of the transparent panel 18, and FIG. 3 illustrates the fact that the bulb or bulbs 22 can be placed on one or both sides of the transparent panel as well as the top.

In FIGS. 2 and 3 we reveal the use of a printed circuit board, integrated circuit or an in line flasher 28, which we may use to control the flashing of a bulb or other suitable illumination device at a desired rate, in order that desired visual effects will be brought about. A small pocket 29 is provided in the interior of the crown to receive the circuit board 28, which is best seen in FIG. 4. Also visible in FIGS. 2 and 3 is a small on-off switch 26, which the user can manipulate to turn on or turn off the power supply used with our illuminating means.

Figure 5A:
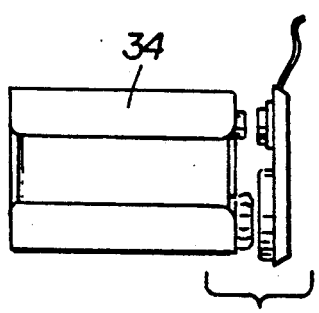
FIGS. 5a, 5b and 5c pertain to battery details.
Figure 5B:
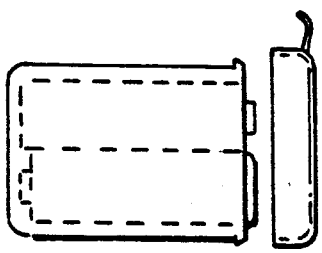
Figure 5C:
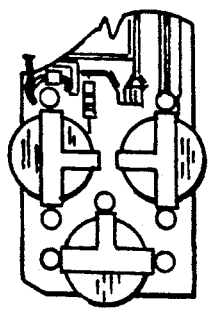

The battery 24 we employ as a power supply for our illuminating means may be in the form of a nine volt battery, as illustrated in FIG. 5a, or it may involve a plurality of one and one-half volt dry cells utilized in series, as shown in FIG. 5b. Still another option is to use a plurality of lithium cells, as revealed in FIG. 5c. These components are typically supported by a battery holder taking the form of a pocket-like member 34 located in the interior of the crown.

With reference now to FIG. 4, it is to be seen that we have shown the interior of an embodiment of the cap 10 in the front of which is an aperture 20 utilizing a panel retaining means in the form of a pocket 30 created in the interior of the cap. The pocket 30 was formed by creating stitching 31 on what may be regarded as three sides of a rectangle, with the fourth side, the side adjacent the brim 36 of the cap, being left open. As will be noted from this figure, the stitching 31 is accomplished in a configuration somewhat larger than the hole or aperture 20 in the front of the cap, so as to create support means for the transparent panel on each side of the hole. These support means slidingly receive the left and right edges of the transparent panel 18.

We prefer to utilize a cap in which a curved piece of webbing is stitched to the brim 36 of the cap to form a flap 38. The flap 38, best seen in FIG. 7, serves to keep the transparent panel 18 from sliding out of the pocket 30 created by the aforementioned stitches. In addition, the piece of webbing may be large enough to serve as a cushion preventing the battery 24 from causing discomfort to the wearer of the cap.

As is obvious, it is necessary for the flap 38 to be folded away from the pocket in order to grant the user access to the transparent panel 18. After insertion of a selected panel, the flap 38 is folded back against the panel.

Figure 6:
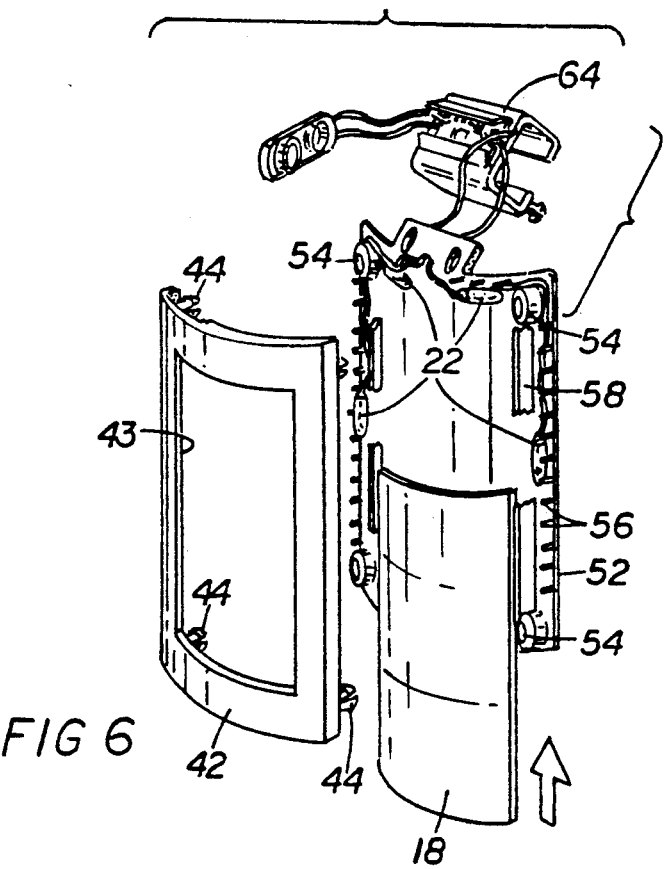
FIG. 6 is a type of exploded view, revealing the plastic frame utilized on the outside of the cap at the location of a hole or aperture in the front of the cap, and adjacent this hole is a perspective type view of the panel-receiving means utilized on the interior of the cap for receiving the transparent panel.

Turning to FIG. 6 it will be seen that we have revealed by a type of exploded view, an embodiment of our invention in the form of a frame-like member 42, that is utilized on the exterior of the cap. As will be readily understood, the member 42 is mounted at a location corresponding to the hole or aperture 20 in the front portion of the crown portion 12 of the cap, adjacent which hole or aperture our novel transparent panel 18 is supported. The frame-like member 42 is to be used in conjunction with a panel-receiving member 52, used in the interior of the cap.

With regard to the frame-like member 42 utilized on the front of the cap, it is to be understood that suitable mounting devices 44 may be disposed on the rear side of the member 42, adjacent the four corners thereof, which mounting devices are to engage complementary mounting devices 54 disposed at the corners of the panel-receiving member 52 located in the interior of the cap. Suitable holes 45 are provided in the fabric of the cap to permit such entry of the fastening devices. In the illustrated embodiment, the devices 44 are male members, and the devices 54 are female, but an alternative to this arrangement could be used as well. As is obvious, the devices 44 are disposed in a carefully aligned relationship to the devices 54.

As will be readily understood, at such time as these four pairs of mounting devices have been moved into an interfitting, locking relationship with the crown material of the cap therebetween, the frame member 42 is tightly held on the exterior of the cap, and the panel-receiving member 52 is tightly supported in the interior of the cap.

With continued reference to FIG. 6, it is to be understood that a series of small, closely spaced pins or protuberances 56 are utilized along the top and side edges of the panel-receiving member 52, with these pins or protuberances serving to engage the fabric of the cap to prevent undesired displacement of this member from the desired location around the central aperture 20.

In order that the transparent panel 18, or certain backer material optionally used with the panel, will not become displaced from the desired position, we provide a boundary defining member 58 around several sides of the panel-receiving member 52, such that after the transparent panel 18 has been inserted in the desired position on the member 52, it is not likely that the panel will be displaced away from such position. As an alternative, we may use separate guide tabs at spaced intervals around the edges of the panel receiving member 52.

It is to be noted in FIG. 6 that we may utilize a plurality of edge illumination means 22 around the edges of the panel-receiving member 52, and the preferred mounting arrangement for the illumination means will be discussed in connection with FIG. 11a and 11b, as well as in connection with FIGS. 12a and 12b.

FIG. 6 additionally reveals that we may utilize at the top of the panel-receiving member 52, a mounting device 64 in which is supported the selected type of battery 24, as well as the small in line flasher or circuit board or chip 28 for timing the flashing of our illumination means. The mounting device 64 may be an integral part of the panel-receiving member 52, or it may be attached to the upper edge of the member 52 by the use of screws or the like.

Figure 7:
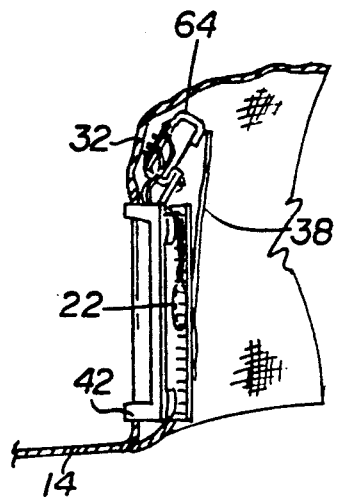
FIG. 7 is a view to a somewhat smaller scale, revealing the components of FIG. 6 in assembled relation, adjacent which is the flap anchored along the interior portion of the brim of the cap.

FIG. 7 is an edge view to a somewhat smaller scale, with the members constituting the support for the transparent panel being revealed in their interfitted relationship. The placement of the flap 38 is made clear in this figure. We have shown a section of crown material in this figure, and as previously mentioned, an aperture is cut in the crown material at the location where the transparent panel is to be utilized.

Figure 8:
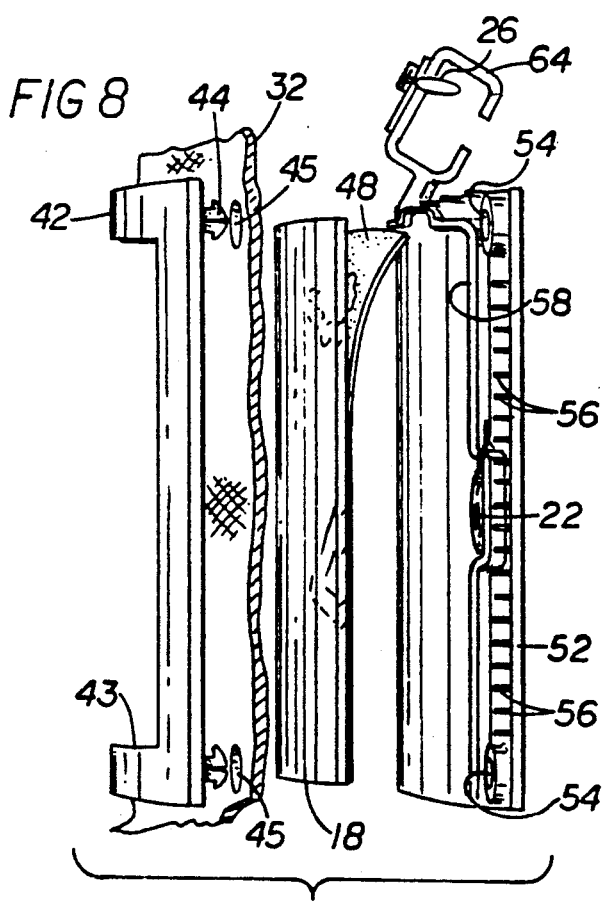
FIG. 8 is another form of exploded view, wherein the front frame, the transparent panel and the panel-receiving means are illustrated, with a background card or a decal located adjacent the backside of the curved transparent panel.

FIG. 8 is similar to FIG. 6 but reveals the frame-like member 42 and the panel-receiving member 52 on each side of the fabric 32 of the cap, just before the mounting devices for these two members are forced into their intended, interfitted relationship. The plurality of small pins 56 utilized to prevent undesired slippage of the panel-receiving member away from the desired relationship are clearly illustrated in this figure.

In order to make the overall relationship clear, we show a section 32 of crown material in which the aforementioned hole 45 is revealed in the crown material, in alignment with each related pair of the devices 44 and 54, to permit the entry of the male member therethrough.

Also illustrated in FIG. 8 is the transparent panel 18 to be inserted into the panel-receiving member 52, with it being revealed in this instance that a decal 48 or the like can be mounted on the backside of the transparent panel 18. By this use of a decal it is readily possible for the motif of the display visible on the front of the cap to be changed when necessary. As will be seen hereinafter, we are not to be limited to the use of decals, for desired indicia or messages can be placed on the rear side of the transparent panel by painting, engraving or by still other means.

Figure 9:
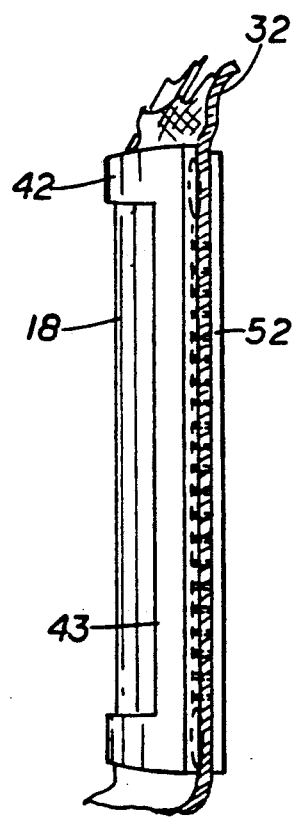
FIG. 9 is a view taken from the same location as FIG. 8, but revealing the front frame and the panel-receiving means in an interfitted relationship, with the fabric of the crown portion of the cap therebetween.

In FIG. 9 we reveal the appearance of the frame member 42 and the panel-receiving member 52 when they have been moved into an interfitting relationship with the cap material 32 therebetween. It is readily apparent from this figure that the numerous small pins utilized around the periphery of the panel-receiving member serve effectively to prevent displacement of these components from the appropriate location adjacent the aperture on the front of the cap.

With reference now to FIG. 10 it will be made clear instead of utilizing a decal on the rear side of the curved transparent front panel 18, that we may paint certain words or pictures on the panel, as revealed at 68. Another option is for us to utilize an etched figure 70 on the panel. Because of the easily accessible arrangements we utilize for supporting a transparent panel on the front of the cap, the wearer can quickly substitute one panel for another. A backer or background device 71 may be used if desired, which may be either plain or decorated.

Turning now to FIG. 11a, it will be seen that we have shown to a large scale, certain significant details of the panel-receiving member 52, and it is particularly important to note that the bulb 72 revealed in this figure is designed to reside in a small outward bulge created in the boundary defining member 58, which outward bulge we may call a bulb mounting means, or more preferably, an alcove 74.

We are concerned with providing a highly satisfactory amount of illumination into the edge 78 of the transparent panel 18, so to that end, we utilize a short section of reflective material 80 on the side of the alcove 74 closest to the bulb 72, with this arrangement functioning much in the same way as does a reflector utilized in conjunction with the bulb of a flashlight.

In addition, we preferably place a high polish on the edge 78 of the transparent panel 18 at the location of the alcove, so that in this way we can transmit as much light as possible from the bulb into the interior of the transparent panel, and we may cover the other edges of the panel with opaque paint. This design of the alcove and the optical surfaces used therewith we regard as being a light intensification device.

FIG. 11b reveals that for reasons of enhanced transfer of illumination into the panel, the blub 72 is preferably disposed very close to the polished edge 78 of the panel 18.

FIGS. 12a and 12b are related figures, principally being concerned with showing different configurations of the panel-receiving member 52 that we may use.

In FIG. 12a it is to be seen that we may utilize a boundary defining member 58 around three sides of the panel-receiving member 52, and it may further be noted that we may use four of the bulb mounting means or alcoves 74 in the member 58, at spaced locations along the top and side edges of this member.

As shown by the arrow in FIG. 12a, in this type of a support arrangement for the curved transparent panel 18, the panel may be slid into the desired position between the boundary defining members 58, and as earlier expained, a flap 38 (not visible in this figure) forming a part of the cap may be utilized for preventing the panel 18 from sliding out of the desired position. As previously mentioned, the bulbs 72 are preferably utilized in a very close relationship to the polished edges 78 of the transparent panel, for maximum transfer of illumination.

With reference now to FIG. 12b, it will be noted that the boundary defining member 58 extends around all four sides of the panel-receiving member 52, with this arrangement making it necessary for the transparent panel 18 to be dropped into place. As in the other figures, we utilize each bulb in a close relationship to the near edge of the panel.

In FIG. 13 we reveal an embodiment of our curved transparent panel 118, in which a plurality of notches 123 are utilized in suitably spaced locations around the circumference of the panel, with these notches being configured for receiving bulbs or other illumination devices in order that satisfactory edge illumination of the panel can be accomplished. In this embodiment, the battery holder 164 may be made an integral part of the panel 118. The battery or batteries of the power supply, as well as the on-off switch 126 and the printed circuit or integrated circuit 128 are also to be seen. The backer card 171 used behind the panel 118 can be plain, or it may have suitable information or designs thereon, or it may be provided in different colors, with a particular motif.

With reference to FIG. 14, we there illustrate that for our edge lit panel 118, each bulb-receiving notch 123 closely receives a bulb 122, with the inner surface of the notch being polished for maximum transfer of illumination to the panel. The base of the bulb may be closely supported by the boundary defining means 158. The panel receiving member utilizes a plurality of pins 156 to engage the fabric of the cap.

In FIG. 15 we show the interior surface of the frame member 142, which is provided with a slot or channel around the four sides thereof, into which the pins 156 of the panel receiving member of FIG. 16 can be received. In FIG. 16 we reveal that the panel-receiving member 152 can directly support the battery holder 164, such as by being integral therewith. The battery holder can also support the circuit 128 responsible for timing the flashing of the bulbs, and providing sufficient current to illuminate the bulbs.

The on-off switch 126 enables the user to turn on or turn off the bulbs, at his or her discretion.

In FIG. 17 we show the panel receiving member or panel supporting member 182, which is provided with a slot 184 therearound, to slidingly receive the transparent panel 118, which of course is edge illuminated by the use of a plurality of spaced slots into which bulbs are to be inserted. The panel supporting member 182 serves to support an integral battery holder 164.

In FIG. 17a we illustrate that the bulb 122 may be held in the appropriate location in the slot 123 by the use of tape 162. By the use of opaque tape on the edges of the transparent panel, the escape of light around the edges of the panel, which in most instances is undesirable, can be effectively prevented.

In FIG. 18 we reveal that a pocket 130 can be utilized in the interior of the cap to receive the panel receiving member 182, and the panel 118 carried therein, with the front of the panel being arranged to coincide with the aperture 120. The use of a flap 138 is optional in this embodiment.

As in all the embodiments, the transparent panel may be rectangular, oval, circular, square, or triangular.

We can use any of a number of different circuits in order to achieve a desired timing of the flashing of the bulbs, and the providing of sufficient power to illuminate the bulbs in the desired mode or sequence. For example, we can use a 555 timing chip, which can be incorporated into a monostable or astable timing circuit. This can be triggered by an external signal or a timing signal built into the circuit. We can use a 2907 transistor to drive the bulbs, that is, to increase the output of the timing means such that sufficient current will flow through the bulbs.

We claim:

1. A cap for displaying information on the front thereof, said cap comprising a crown portion adapted to be worn on the head of the user and having a front section, said front section having an opening therein, adjacent which are panel-supporting means, said panel-supporting means being configured to receive a panel of transparent material having a light-receiving edge and to support same adjacent said opening, and means for illuminating said transparent material, said illumination means illuminating the panel from the edge thereof.

2. The cap for displaying information as recited in claim 1 in which said illumination means involves the use of at least one bulb, and a notch is provided in the edge of said panel, to receive said bulb.

3. The cap for displaying information as recited in claim 1 in which said illumination means involves the use of at least two bulbs, and notches are provided in the edge of said panel, to receive said bulbs.

4. The cap for displaying information as recited in claim 1 in which said illumination means involves the use of bulbs of different colors.

5. A cap for displaying information on the front thereof, said cap comprising a crown portion adapted to be worn on the head of the user and having a front section, said front section having an opening therein, adjacent which are panel-supporting means, said panel-supporting means being configured to receive a panel of transparent material and to support same adjacent said opening, and means for illuminating said transparent material, said illumination means being powered by a battery supported from said transparent panel.

6. A cap for displaying information on the front thereof, said cap comprising a crown portion adapted to be worn on the head of the user and having a front section and an interior, said front section having an opening therein, adjacent which are panel-supporting means, said panel-supporting means being configured to receive a panel of transparent material and to support same adjacent said opening, and means for illuminating said transparent material, said panel being mounted on a panel-receiving means, and said illumination means being powered by a battery supported by said panel-receiving means, said panel-receiving means being received in a pocket defined on the interior of said cap, adjacent said opening.

7. A cap for displaying illuminated information, said cap comprising a crown portion adapted to be worn on the head of the user and having a front section a visor portion affixed to the front of said crown portion, directly below said front section, said front section having a generally rectangularly shaped opening, along the sides of which are panel-supporting means, said panel-supporting means being configured to receive a panel of curved, transparent material having a light-receiving edge, upon which information may be seen, and means for illuminating said curved panel, said illumination means illuminating the panel from the edge thereof.

8. The cap for displaying information as recited in claim 7 in which said illumination means involves the use of at least one bulb, and a notch is provided in the edge of said panel, to receive said bulb.

9. The cap for displaying information as recited in claim 7 in which said illumination means involves the use of at least two bulbs, and notches are provided in the edge of said panel, to receive said bulbs.

10. A cap for displaying illuminated information, said cap comprising a crown portion adapted to be worn on the head of the user and having a front section, a visor portion affixed to the front of said crown portion, directly below said front section, said front section having a generally rectangularly shaped opening, along the sides of which are panel-supporting means, said panel-supporting means being configured to receive a panel of curved, transparent material, upon which information may be seen, and means for illuminating said curved panel, said illumination means involving the use of at least two bulbs, with notches being provided in the edge of said panel, to receive said bulbs, said illumination means involving the use of bulbs of different colors.

11. A cap for displaying illuminated information, said cap comprising a crown portion adapted to be worn on the head of the user and having a front section, a visor portion affixed to the front of said crown portion, directly below said front section, said front section having a generally rectangularly shaped opening, along the sides of which are panel-supporting means, said panel-supporting means being configured to receive a panel of curved, transparent material, upon which information may be seen, and means for illuminating said curved panel, said illumination means being powered by a battery supported from said transparent panel.

12. A cap for displaying illuminated information, said cap comprising a crown portion adapted to be worn on the head of the user and having a front section and an interior, a visor portion affixed to the front of said crown portion, directly below said front section, said front section having a generally rectangularly shaped opening, along the sides of which are panel-supporting means, said panel-supporting means being configured to receive a panel of curved, transparent material, upon which information may be seen, and means for illuminating said curved panel, said illumination means being powered by a battery supported by said panel-supporting means, said panel-supporting means being received in a pocket defined on the interior of said cap, adjacent said opening.

* * * * *